United States Patent
Guthke et al.

(10) Patent No.: US 8,242,367 B2
(45) Date of Patent: Aug. 14, 2012

(54) CABLE GUIDING ARRANGEMENT FOR A CABLEFORM INSIDE AN AIRCRAFT CABIN

(75) Inventors: Hans-Peter Guthke, Buxtehude (DE); Lueder Kosiankowski, Harsefeld (DE)

(73) Assignee: Airbus Operations GmbH, Hamburg (DE)

( * ) Notice: Subject to any disclaimer, the term of this patent is extended or adjusted under 35 U.S.C. 154(b) by 223 days.

(21) Appl. No.: 12/762,104

(22) Filed: Apr. 16, 2010

(65) Prior Publication Data

US 2010/0294564 A1 Nov. 25, 2010

Related U.S. Application Data

(60) Provisional application No. 61/169,787, filed on Apr. 16, 2009.

(30) Foreign Application Priority Data

Apr. 16, 2009 (DE) .......................... 10 2009 017 319

(51) Int. Cl.
*H02G 3/04* (2006.01)
(52) U.S. Cl. .................. 174/72 A; 174/68.1; 174/72 C; 174/100; 439/207; 248/63; 248/68.1; 361/826
(58) Field of Classification Search ................. 174/68.1, 174/72 A, 72 C, 100; 439/207; 248/49, 68.1, 248/63, 71, 73; 361/826; 211/26
See application file for complete search history.

(56) References Cited

U.S. PATENT DOCUMENTS

| | | | |
|---|---|---|---|
| 3,632,069 A * | 1/1972 | Thayer et al. ................... | 248/56 |
| 5,388,790 A * | 2/1995 | Guthke et al. ................... | 248/58 |
| 6,875,916 B2 | 4/2005 | Winkelbach et al. | |
| 6,994,300 B2 * | 2/2006 | Labeirie et al. ................. | 248/70 |
| 7,276,666 B2 * | 10/2007 | Zeuner et al. ................. | 174/154 |
| 7,471,868 B2 | 12/2008 | Bayazit et al. | |
| 7,760,983 B2 | 7/2010 | Jadaud | |
| 7,829,789 B2 * | 11/2010 | Yamaguchi ................. | 174/72 A |
| 2009/0072098 A1 | 3/2009 | Smallhorn | |

FOREIGN PATENT DOCUMENTS

| | | |
|---|---|---|
| DE | 10248241 A1 | 5/2004 |
| DE | 102004045964 A1 | 4/2006 |
| EP | 2037552 A2 | 3/2009 |
| FR | 2888412 A1 | 1/2007 |

* cited by examiner

*Primary Examiner* — Dhirubhai R Patel
(74) *Attorney, Agent, or Firm* — Leydig, Voit & Mayer, Ltd.

(57) ABSTRACT

A cable guiding arrangement for at least one electrical cable harness installed in an aircraft cabin includes a guide rail having at least one receiving pocket and an attachment surface configured to receive the at least one cable harness; a plurality of retaining heads spaced apart from each other in a longitudinal direction along the guide rail and configured to affix the at least one electrical cable harness; and at least one insertion element disposed on an edge of the guide rail configured to attach at least one laterally branching-off cable of the at least one cable harness, the at least one insertion element including at least one retaining head section and an insertion section, wherein the insertion section is disposed in the at least one receiving pocket.

10 Claims, 2 Drawing Sheets

CABLE GUIDING ARRANGEMENT FOR A CABLEFORM INSIDE AN AIRCRAFT CABIN

Priority is claimed to German Application No. DE 10 2009 017 319.6, filed on Apr. 16, 2009, and U.S. Provisional Application No. 61/169,787, filed on Apr. 16, 2009. The entire disclosure of both applications is incorporated by reference herein.

The present invention relates to a cable guiding arrangement for at least one cableform or electrical cable harness installed inside an aircraft cabin, comprising a guide rail with an attachment surface for the cable harness, along which guide rail several retaining heads are arranged so as to be spaced apart from each other, in longitudinal direction, for affixation of the at least one electrical cable harness, wherein on the edge of the guide rail additional retaining means for attaching laterally branching-off cables of the cable harness are arranged.

BACKGROUND

The field of application of the present invention relates to aircraft technology. Numerous pipes and electrical lines that are bundled to form cable harnesses extend within aircraft cabins. In order to immovably affix in particular such electrical cable harnesses to the aircraft cabin, cable guiding arrangements are used that are installed in a rail-like manner along the desired direction of extension of one or several parallel cable harnesses and that to this extent carry out a guide function; apart from this, the cable guiding arrangements that are of interest in the present document also carry out an attachment function, because the cable harnesses are fixed to the aforesaid by means of suitable attachment means, for example cable ties. Depending on the application, cable guiding arrangements can be designed so as to be either rail-like or duct-like.

From DE 10 2004 045 964 A1 a duct-like cable guiding arrangement is known which essentially comprises a guide rail that in order to form a cable duct is closed off by means of a curved cover. The guide rail comprises several intermediate wall sections that extend in longitudinal direction, and consequently several individual ducts are formed, each receiving a cable harness. In order to lead individual cables or the entire cable harness at a desired position laterally from the duct-like cable guiding arrangement, the cover comprises an approximately rectangular recess of adequate size. The recess can be formed by a separate cable outlet element made from plastic, which cable outlet element is capable of being plugged together. This technical solution makes it possible to make individual cables or a complete cable harness branch off from the duct-like cable guiding arrangement through the cover, in other words upwards in relation to the installation surface of the cable guiding arrangement.

However, in particular applications it is necessary to make cables branch off laterally from a cable guiding arrangement, at the support structure of the cable guiding arrangement in the attachment plane of said cable guiding arrangement. If for this purpose the rail-like cable guiding arrangements that are of interest in the context of the present invention are used, normally additional cable holders are used to guide cables of the cable harness that branch off laterally from the guide rail, which cable holders are attached to the guide rail by means of a screw connection.

However, this arrangement is associated with a disadvantage in that a screw connection often contacts the laterally branching-off cables so that undesirable chafing points on electrical cables can result, and consequently there is a danger of short circuits occurring. Apart from this, the installation of such additional screw-on retaining means is quite involved.

SUMMARY OF THE INVENTION

An aspect of the present invention is to create a cable guiding arrangement for an electrical harness, which cable guiding arrangement comprises simply-installable retaining means on the edge, which retaining means are detachably attached to the edge of a guide rail without being associated with the risk of short circuits.

The invention includes the technical teaching according to which an insertion element comprising at least one retaining head section and an insertion section are provided as an additional retaining means, with the insertion section of said insertion element being inserted into a corresponding receiving pocket of the guide rail of a cable guide arrangement, which receiving pocket is arranged on the edge.

The solution according to the invention is associated with an advantage in particular in that no additional attachment material such as screws, nuts and the like is necessary to affix additional retaining means. Nor is there any need for tools in order to attach these retaining means; an aspect which simplifies installation. The insertion elements according to the invention can simply and quickly be laterally attached to, and removed from, the guide rail of the cable guiding arrangement. The occurrence of chafing points is prevented.

According to a measure that improves the invention it is proposed that the insertion element inserted in the receiving pocket is locked by way of a detachable clip connection. While it is possible to press the insertion elements into place while maintaining a slight press fit relative to the receiving pocket, wherein the insertion element is subsequently held by the cable harness installed thereon or by way of the branching-off cables and their affixation by means of cable ties, the clip connection nevertheless provides additional security against unwanted detachment of the insertion element from the receiving pocket of the guide rail.

Preferably, such a detachable clip connection comprises a resilient tongue arranged on the guide rail in the region of the receiving pocket, which resilient tongue engages a corresponding affixation recess on the insertion element by way of a locking cam. Of course, it is also imaginable to design the resilient tongue on the insertion element and to arrange the locking cam on the receiving pocket on the guide rail. Such a clip connection can be implemented in a simple manner from the point of view of production technology. If the guide rail and the insertion element comprise a plastic material, then production applying injection-moulding is advantageous.

According to a measure that improves the detachable clip connection, it is proposed that the locking cam comprise an inlet slope for the insertion element. By means of the inlet slope the insertion element can be inserted into the receiving pocket without any hindrance by resetting the resilient tongue, wherein the locking cam in the end stop position of the insertion element clicks into the affixation recess of the insertion element thus ensuring secure retention of the insertion element.

The guide rail with retaining heads and the receiving pockets formed to it is preferably made in one piece by means of injection moulding; it comprises a plastic material suitable for this purpose, for example polyamide (PA).

The receiving pocket for receiving an insertion element can be designed in various ways. For example, according to a preferred embodiment it is proposed that the receiving pocket comprises a tunnel-like U-shaped material moulding on the underside of the guide rail, which receiving pocket preferably forms a rectangular recess for receiving the insertion element. Since the insertion section of the insertion element is completely encompassed by such a tunnel-like material moulding, this variant is particularly stable. According to another embodiment it is proposed that in contrast to the above the receiving pocket be designed so as to be open, namely comprising two angle rails that extend parallel to each other on the underside of the guide rail, which angle rails form a rail receiving device for the insertion element. This exemplary embodiment provides an advantage in that correct locking of the insertion element in the final position can additionally be verified by means of a visual inspection.

The solution according to the invention is suitable for guide rails comprising several parallel retaining head rows, each comprising retaining heads that are arranged so as to be spaced apart from each other, with an associated cable harness being affixable to each retaining head. The space between two adjacent retaining head rows can preferably be equipped with holes or other receiving means in order to attach to it further mounting parts such as insertion holders, angular sheet metal for connection to the cabin structure, and the like.

BRIEF DESCRIPTION OF THE DRAWINGS

Further measures that improve the invention are shown in greater detail below with reference to the figures, together with the description of a preferred exemplary embodiment of the invention. The following are shown.

DETAILED DESCRIPTION

Figure 1:
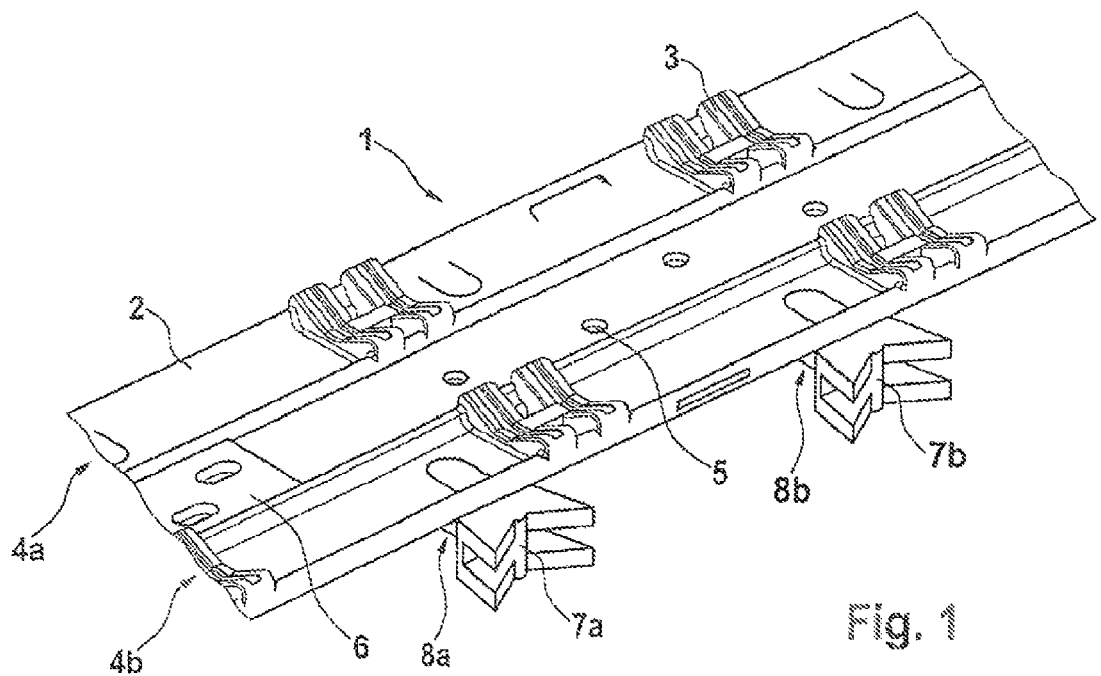
FIG. 1 a perspective partial view of the top of a guide rail of a cable guiding arrangement, FIG. 2 a cross section of the guide rail according to FIG. 1 with installed insertion elements, FIG. 3 a perspective partial view of the underside of the guide rail according to FIG. 1 with inserted insertion elements, and FIG. 4 a perspective view of the guide rail according to FIG. 3 with an exemplarily installed insertion element.

According to FIG. 1, a guide rail 1 of a cable guiding arrangement, of which a section is shown, on an upper attachment surface 2 comprises several retaining heads 3, arranged so as to be spaced apart from each other, for affixation of an electrical cable harness (not shown in the drawing). The retaining heads 3 extend along two retaining head rows 4a and 4b for attachment of two associated cable harnesses that extend parallel to each other. Between the two adjacent retaining head rows 4a and 4b of the guide rail 1 the guide rail 1 comprises several individual holes 5 to which mounting parts 6, for example installation angles and the like, can be screwed. On the edge of the guide rail 1, insertion elements 7a and 7b are inserted in corresponding receiving pockets 8a or 8b of the guide rail 1 so that a detachable clip connection is formed.

Figure 2:
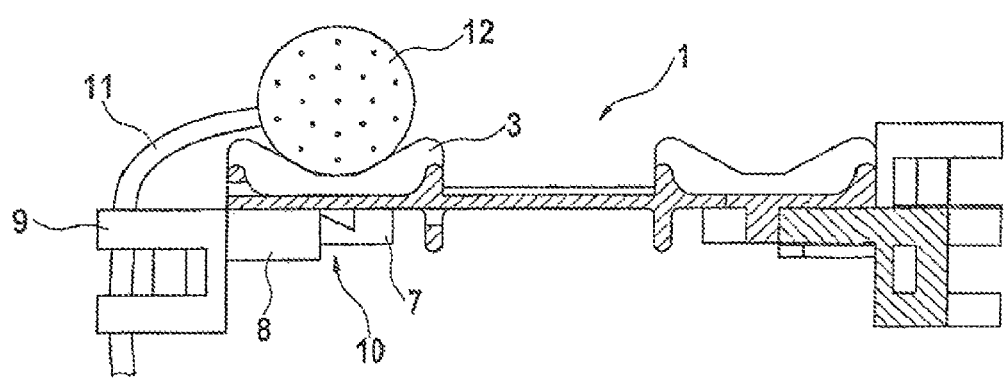

According to FIG. 2, the insertion element 7 comprises a front retaining head section 9 and a rear insertion section 10. By means of the retaining head section 9, laterally branching-off cables 11 of the cable harness 12, which in the present embodiment is shown as an example, are affixed. The insertion section 10 of the insertion element 7 is inserted in a corresponding receiving pocket 8 of the guide rail 1.

Figure 3:
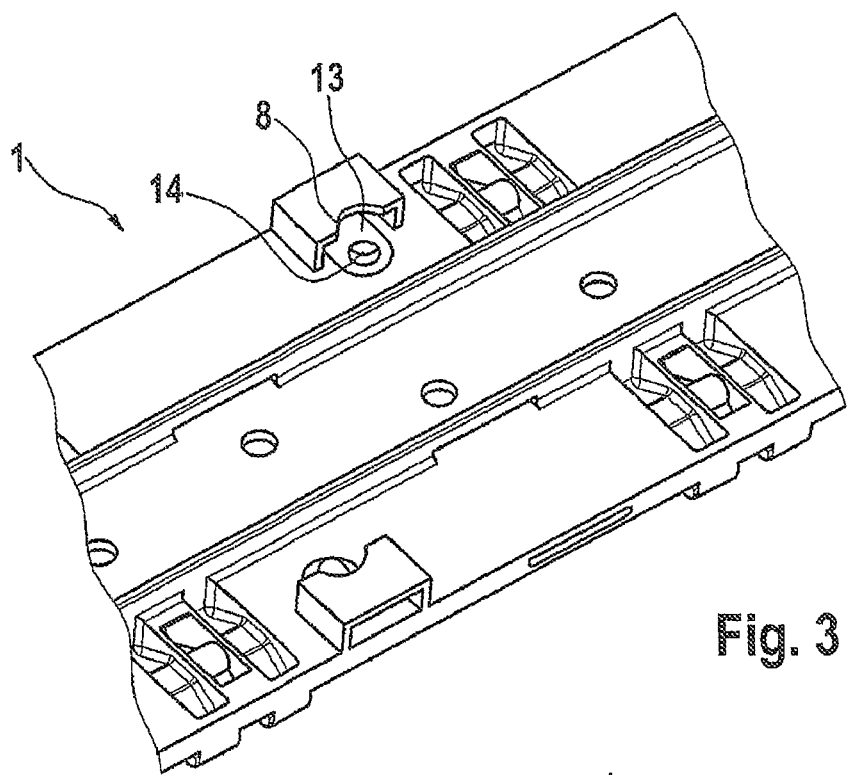

According to FIG. 3, the clip connection on the guide rail 1 comprises a resilient tongue 13 provided in the region of the receiving pocket 8. The resilient tongue 13 is formed by a U-shaped insertion in the material of the guide rail 1. The resilient tongue 13 engages the corresponding affixation recess on the insertion element 7 (not shown) by way of a locking cam 14. The locking cam 14 comprises an inlet slope for the insertion element 7.

Figure 4:
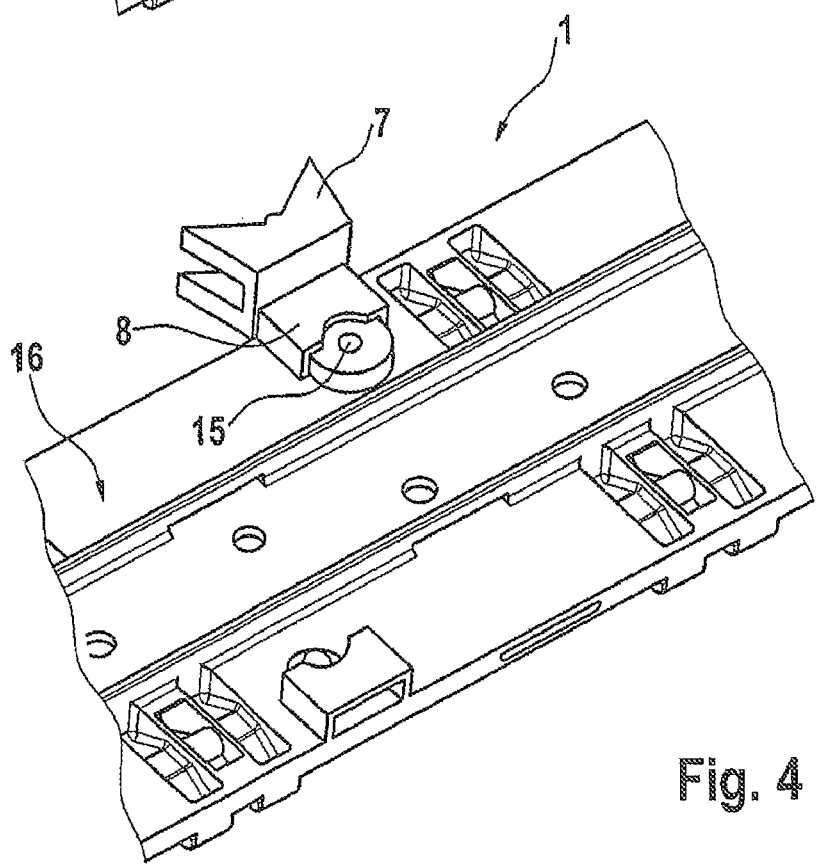

According to FIG. 4, the locking cam 14 (not visible in the diagram) reaches an affixation recess 15 on the insertion element 7 so that the insertion element 7 is secured against any unintended falling out of the receiving pocket 8. In this exemplary embodiment the receiving pocket 8 is made from a tunnel-like U-shaped material moulding on the underside 16 of the guide rail 1, which material moulding on the inside preferably comprises a rectangular cross-section for receiving the insertion element 7.

The invention is not limited to the preferred exemplary embodiment described above. Instead, modifications of this are imaginable that are covered by the scope of protection of the following claims. For example, it is also possible to design the receiving pocket 8 so that it is open, in that only angle rails that extend parallel are formed to the guide rail 1, which angle rails receive the insertion element 7.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Guide rail
2 Attachment surface
3 Retaining head
4 Retaining head row
5 Hole
6 Mounting part
7 Insertion element
8 Receiving pocket
9 Retaining head section
10 Insertion section
11 Cable
12 Cable harness
13 Resilient tongue
14 Locking cam
15 Affixation recess
16 Underside

What is claimed is:

1. A cable guiding arrangement for at least one electrical cable harness installed in an aircraft cabin comprising:
a guide rail having at least one receiving pocket and an attachment surface configured to receive the at least one cable harness;
a plurality of retaining heads disposed on the attachment surface, spaced apart from each other in a longitudinal direction along the guide rail, and configured to affix the at least one electrical cable harness; and
at least one insertion element disposed on an edge of the guide rail configured to attach at least one laterally branching-off cable of the at least one cable harness, the at least one insertion element including at least one retaining bead section and an insertion section, wherein the insertion section is disposed in the at least one receiving pocket.

2. The cable guiding arrangement as recited in claim 1, wherein the at least one insertion element is locked by a detachable clip connection.

3. The cable guiding arrangement as recited in claim 2, wherein the clip connection includes a resilient tongue disposed on the guide rail in an area of the receiving pocket, the resilient tongue engaging a corresponding affixation recess of the at least one insertion element via a locking cam.

4. The cable guiding arrangement as recited in claim 3, wherein the locking earn includes an inlet slope for the at least one insertion element.

5. The cable guiding arrangement as recited in claim 1, wherein the guide rail, the plurality of retaining heads, and the at least one receiving pocket are integrally formed one piece from an injection molded plastic material.

6. The cable guiding arrangement as recited in claim 1 wherein the at least one receiving pocket includes a tunnel-like U-shaped material molding on an underside of the guide rail so as to form a rectangular recess configured to receive the at least one insertion element.

7. The cable guiding arrangement as recited in claim 1, wherein the at least one receiving pocket includes two angle rails extending parallel to each other on an underside of the guide rail so as to form a receiving device for the at least one insertion element.

8. The cable guiding arrangement as recited in claim 1, wherein the plurality of retaining heads are arranged in at least two retaining head rows on the guide rail, wherein the at least one cable harness includes at least two cable harnesses extending in parallel each affixable to one of the at least two retaining head rows.

9. The cable guiding arrangement as recited in claim 1, wherein the plurality of retaining heads are disposed in at least two retaining head rows and the guide rail includes a plurality of holes disposed between the at least two retaining head rows, the holes being spaced apart from each other and disposed to mount at least one mounting part.

10. The cable guiding arrangement as recited in claim 1, wherein the at least one cable harness is affixable on the at least one retaining head via at least one cable tie, and wherein the at least one laterally branching-off cable is affixable on the at least one retaining head section via the at least one cable tie.

* * * * *